June 14, 1960     G. W. STAHL     2,940,241
SHAFT GUARD FOR LAWN MOWERS
Filed Sept. 15, 1958
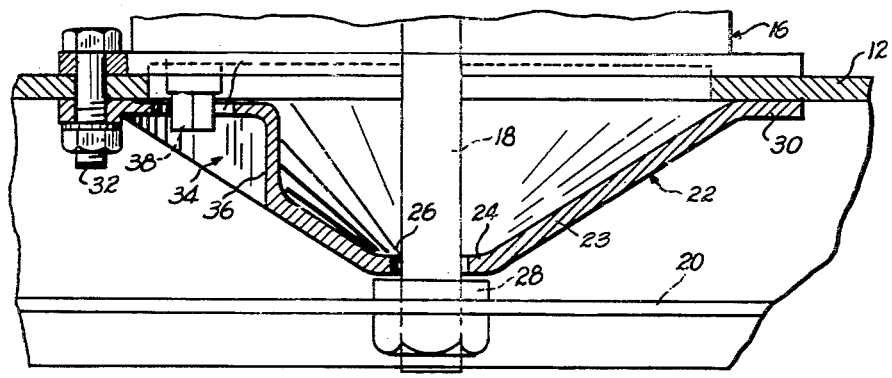
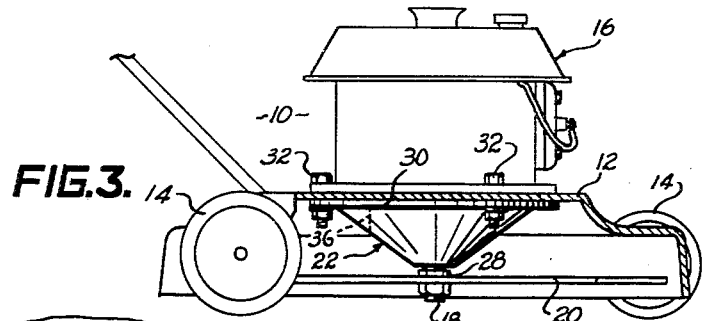
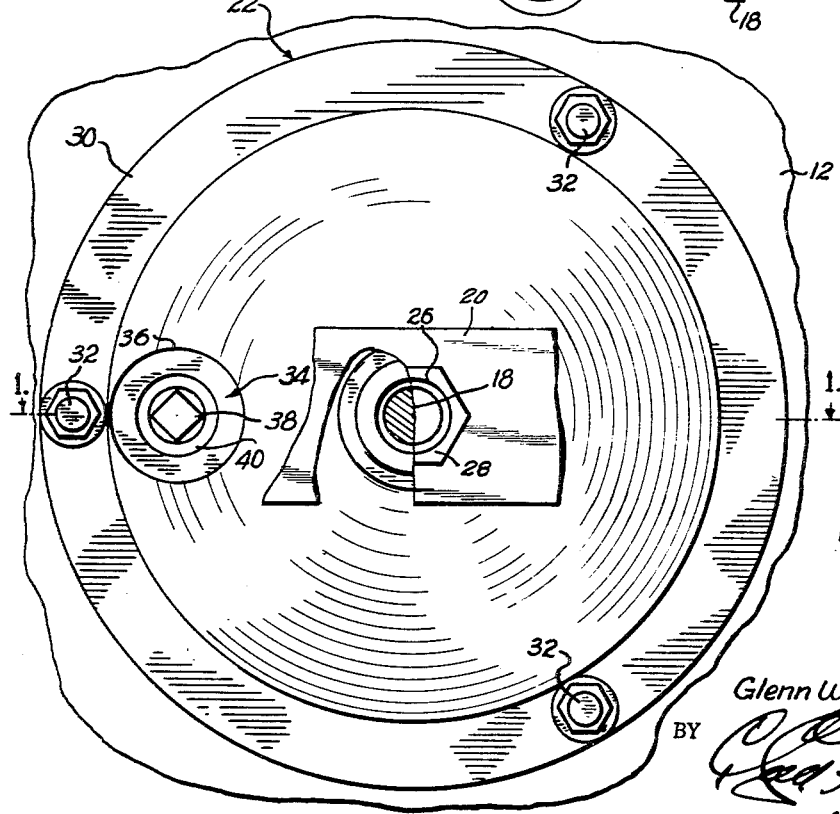
INVENTOR.
Glenn W. Stahl
BY
ATTORNEY.

United States Patent Office 2,940,241
Patented June 14, 1960

2,940,241

SHAFT GUARD FOR LAWN MOWERS

Glenn W. Stahl, Kingsville, Mo., assignor to Keen Manufacturing Co., Inc., Kansas City, Mo., a corporation of Missouri Filed Sept. 15, 1958, Ser. No. 760,888

7 Claims. (Cl. 56—25.4)

The present invention has to do with lawn mower improvements and more particularly, to the elimination of problems incident to damage of the drive shaft of an engine to which the cutter blade of the mower is attached.

Lawn mowers of the type in which a rotary blade is mounted for horizontal rotation beneath a mobile platform, are inherently subject to damage which oftentimes becomes excessive whenever the blade strikes objects such as heavy rocks, fences, trees and the like with a resultant sudden stopping of the rotation of the blade. Attempts heretofore made to solve the problem include the so-called clutch attachment of the blade to the engine shaft so that theoretically, the shaft continues to rotate if the blade srikes a nonyielding object. The fallacy of such reasoning becomes apparent however, when it is realized that the shock is so sudden that damage occurs particularly to the drive shaft before any such relative rotation of the shaft to the blade can possibly occur.

Consequently, the shafts are deflected out of true and bent, oftentimes at rather sharp angles, necessitating costly repair and replacement.

It is, therefore, the most important object of the present invention to provide a guard for the drive shaft of a lawn mower for preventing undue deflection as the result of the cutter blade striking various objects, which guard is easily attached to virtually any type of mower of this character and universally adapted for standard shafts commonly employed therein.

Another important object of the instant invention is to provide a guard that, in addition to limiting the extent of lateral deflection of the shaft, permits the latter to flex slightly under the influence of the shock to the end that forces of the initial impact are absorbed, thereby lessening consequent damage to other parts of the mower, including the engine itself.

In the drawing:

Fig. 1 is a fragmentary, vertical, cross-sectional view through a lawn mower having a shaft guard made pursuant to the present invention and taken on line 1—1 of Fig. 2;

Fig. 2 is a fragmentary, inverted view looking upwardly toward the shaft guard and proximal parts of the lawn mower wherein parts are broken away and shown in section; and Fig. 3 is a fragmentary, side elevational view of the lawn mower on a reduced scale and having a portion of the platform thereof broken away and parts shown in section to illustrate the shaft guard.

The lawn mower 10 chosen for illustration of the principles of the instant invention is of conventional character in that it is provided with a hollow, downwardly-facing platform 12 rendered mobile through use of a plurality of ground-engaging wheels 14.

An engine 16 carried by the platform 12 thereabove has a vertical drive shaft 18 extending through the platform 12 and depending therebelow to which is attached a cutter blade 20 for rotation within a substantially horizontal plane. Guard 22 forming the subject matter of the instant invention and designed to protect the shaft 18, loosely surrounds the latter in coaxial relationship thereto.

To this end, therefore, a preferred construction is, as illustrated in the drawing, wherein guard 22 is in the nature of a hollow, cup-shaped or substantially frusto-conical body having a support portion 23, and a flat bottom 24 in parallelism with the platform 12 and the blade 20. It is within such flat bottom portion 24 of the guard 22 that a circular opening 26 is formed for loosely receiving the shaft 18 just above the blade 20, but in close juxtaposition thereto and spaced below the bottom of the platform 12. Thus, as best seen in Fig. 1, it is to be preferred that the bottom 24 and, therefore, its opening 26, be next adjacent nut flange or stop 28 commonly employed to limit the extent of upward movement of the blade 20 along shaft 18.

Guard 22 is attached directly to the platform 12 and to this end, it is provided with an integral, outturned, annular flange 30 at its uppermost edge which bears flatly against the lower face of the platform 12. It is advantageous to provide common means of attachment for engine 16 and guard 22 to the platform 12 and, therefore, fasteners such as engine mounting bolts 32, pass through platform 12 and through the flange 30 as is clear in the drawing. A recess 34 in guard 22, defined in part by a reinforcing upstanding, arcuate wall 36, clears oil drain plug 38 for engine 16 by virtue of an opening 40 in guard 22.

When the lawn mower 10 is placed in normal use, guard 22 has no adverse effect upon the freedom of the cutting action since, as is well known, the cutting action occurs only at the tips of the blade 20 radially remote from the axis of the shaft 18. Furthermore, guard 22 will not interfere with discharge of the cuttings; in fact, its relatively smooth, conical, outer surface will tend to deflect the cuttings downwardly away from the bottom of the platform 12 and tend to eliminate winding about the shaft 18 or clogging and collecting in and around the platform 12.

In the event, however, that the blade 20 comes into contact with objects that stop or tend to stop the rotation thereof, undue lateral deflection of shaft 18 is prevented because of shaft 18 engaging the circular edge of guard 22 forming the opening 26 in the bottom 24 thereof. The materials from which drive shafts 18 for engines 16 are normally made, have a certain degree of resiliency, notwithstanding the hardness thereof. If, however, the shaft is unduly deflected, it will set up a bend therein, necessitating repair or replacement.

By way of example only, for a ⅞ inch diameter shaft of standard manufacture it has been found that the diameter of opening 26 should be 15/16 of an inch when the axial distance along the shaft between the periphery of an opening 26 and the shaft bearing is approximately 2¾ inches.

The clearance between the shaft and the guard opening periphery allows limited lateral shaft deflection which prevents the shaft from bending or setting up under impact. That is, it permits shaft deflection within the limit of resilient shaft flexure.

Noteworthy is the fact that the guard 22, because of its peculiar shape and configuration, is adequately able to withstand the shock of impact of the shaft 18 thereon in any direction, the forces being dissipated evenly in an outward direction toward the flange 30 and, therefore, platform 12.

The provision of the clearance in opening 26 around the shaft 18 so that no part of the guard 22 actually contacts shaft 18 during normal use, is highly important, not only from the standpoint of eliminating all frictional resistance to free rotation of shaft 18, but more important, to permit shaft 18 to deflect and yield slightly in response to the impact and thereby reduce damage to blade 20, as well as to the bearings and other parts of the engine 16 whenever the rotation of blade 20 is retarded or suddenly stopped because of striking heavy objects during use of the lawn mower 10.

In this respect, the use of bearings, bushings or the like around the shaft and in engagement therewith, is to be avoided for the reason that the same would become quickly and easily damaged from slight impacts, requiring either constant repair or replacement, or operation under defective conditions to the ultimate damage of the entire assembly. Furthermore, attempt to brace or support the shaft adjacent the blade, presents many problems of frictional resistance and tendency of collecting dirt and debris which not only damage the bearings or bushings themselves, but cause undue wear in the shaft.

Having thus described the invention what is claimed as new and desired to be secured by Letters Patent is:

1. In a direct drive rotary power lawn mower, a platform upon which an engine is mounted, an engine drive shaft extending downwardly through an opening in said platform, a guard connected to said platform and disposed therebeneath, said guard having an opening vertically spaced beneath said platform through which the shaft extends, said shaft being centrally positioned in the guard opening out of contact with the periphery of said opening and adapted to support a cutter blade beneath the guard, the clearance at the point between the shaft and the periphery of the guard opening permitting lateral shaft deflection within the limit of resilient shaft flexure.

2. In a direct drive rotary power lawn mower, a platform upon which an engine is mounted, an engine drive shaft extending downwardly through an opening in said platform, a dish-shaped downwardly extending guard plate connected to said platform and disposed therebeneath, said guard having a circular opening vertically spaced beneath said platform through which the shaft extends, said shaft being centrally positioned in the guard opening out of contact with the periphery of said opening and adapted to support a cutter blade beneath the guard, the clearance at the point between the shaft and the periphery of the guard opening permitting lateral shaft deflection within the limit of resilient shaft flexure.

3. In a direct drive rotary power lawn mower, a platform upon which an engine is mounted, an engine drive shaft extending downwardly through an opening in said platform, a substantially frusto-conical downwardly extending guard plate having its base attached to said platform and disposed therebeneath, said guard having a circular opening in the lowermost and central portion of said guard, said shaft extending through said guard opening and concentrically positioned with respect thereto out of contact with the periphery of said opening, said shaft adapted to support a cutter blade beneath the guard, the clearance at the point between the shaft and the periphery of the guard opening permitting lateral shaft deflection within the limit of resilient shaft flexure.

4. In a direct drive rotary power lawn mower as set forth in claim 3 wherein said guard has an opening therein to permit access to the crank case drain plug of the lawn mower engine.

5. In a direct drive rotary power lawn mower, a platform upon which an engine is mounted, an engine drive shaft extending downwardly through an opening in said platform, a guard connected to said platform and disposed therebeneath, said guard having an annular portion with an opening therein and a support integral therewith, said support being attached to said platform, said opening being vertically spaced beneath the platform, said shaft extending through said opening out of contact with the periphery of said opening and being centrally positioned with respect thereto, said shaft adapted to support a cutter blade beneath the guard, the clearance at the point between the shaft and the periphery of the guard opening permitting lateral shaft deflection within the limit of resilient shaft flexure.

6. In a direct drive rotary power lawn mower, a platform upon whicn an engine is mounted, an engine drive shaft, extending downwardly through an opening in said platform, a downwardly extending guard plate connected to said platform and disposed therebeneath, said guard having an opening vertically spaced beneath said platform through which the shaft extends, said shaft being centrally positioned in the guard opening out of contact with the periphery of said opening and adapted to support a cutter blade beneath the guard, the clearance at the point between the shaft and the periphery of the guard opening being sufficient to permit lateral deflection of the shaft up to and not exceeding the normal resilient shaft flexure.

7. In a direct drive rotary power lawn mower, a platform upon which an engine is mounted, an engine drive shaft extending downwardly through an opening in said platform, a guard connected to said platform and disposed therebeneath, said guard having an opening vertically spaced beneath said platform through which the shaft extends, said shaft being centrally positioned in the guard opening out of contact with the periphery of said opening and adapted to support a cutter blade beneath the guard, the clearance at the point between the shaft and the periphery of the guard opening permitting lateral shaft deflection between the lowermost shaft bearing and the guard opening but restricting such deflection so that the limit of resilient shaft flexure is not exceeded.

References Cited in the file of this patent

UNITED STATES PATENTS

| | | |
|---|---|---|
| 1,622,611 | Sera | Mar. 29, 1927 |
| 2,675,662 | Kroll | Apr. 20, 1954 |
| 2,680,339 | Murphy | June 8, 1954 |
| 2,720,742 | Hilton | Oct. 18, 1955 |
| 2,737,003 | Beers | Mar. 6, 1956 |
| 2,815,634 | Bush | Dec. 10, 1957 |
| 2,836,430 | Langenbacher | May 27, 1958 |